Figure 1:
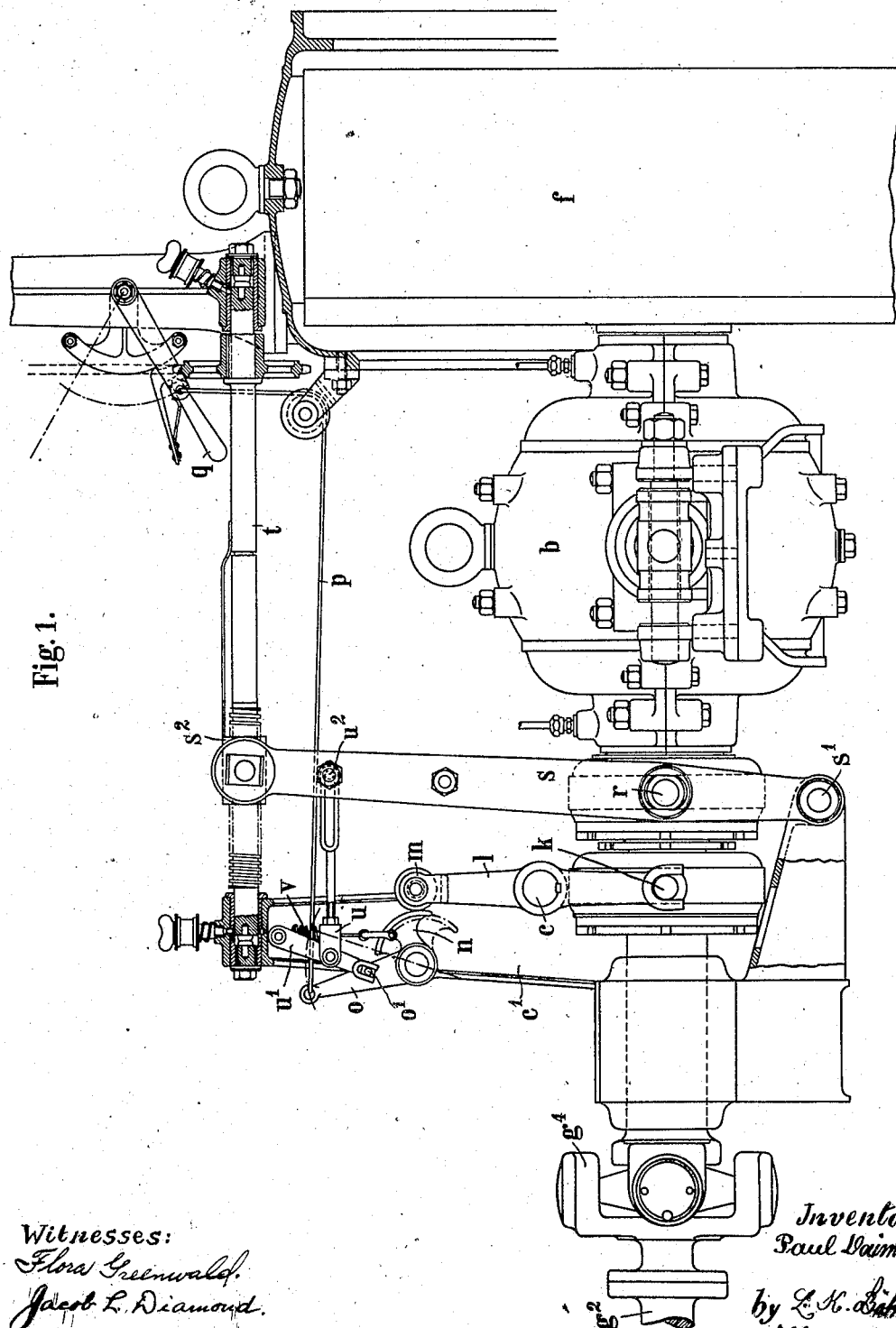

P. DAIMLER.
TRANSMISSION GEAR FOR PROPELLER SHAFTS AND THE LIKE.
APPLICATION FILED NOV. 12, 1908.

924,323.

Patented June 8, 1909.
4 SHEETS—SHEET 1.

Witnesses:
Flora Greenwald.
Jacob L. Diamond.

Inventor
Paul Daimler
by L. H. Lehr
Attorney

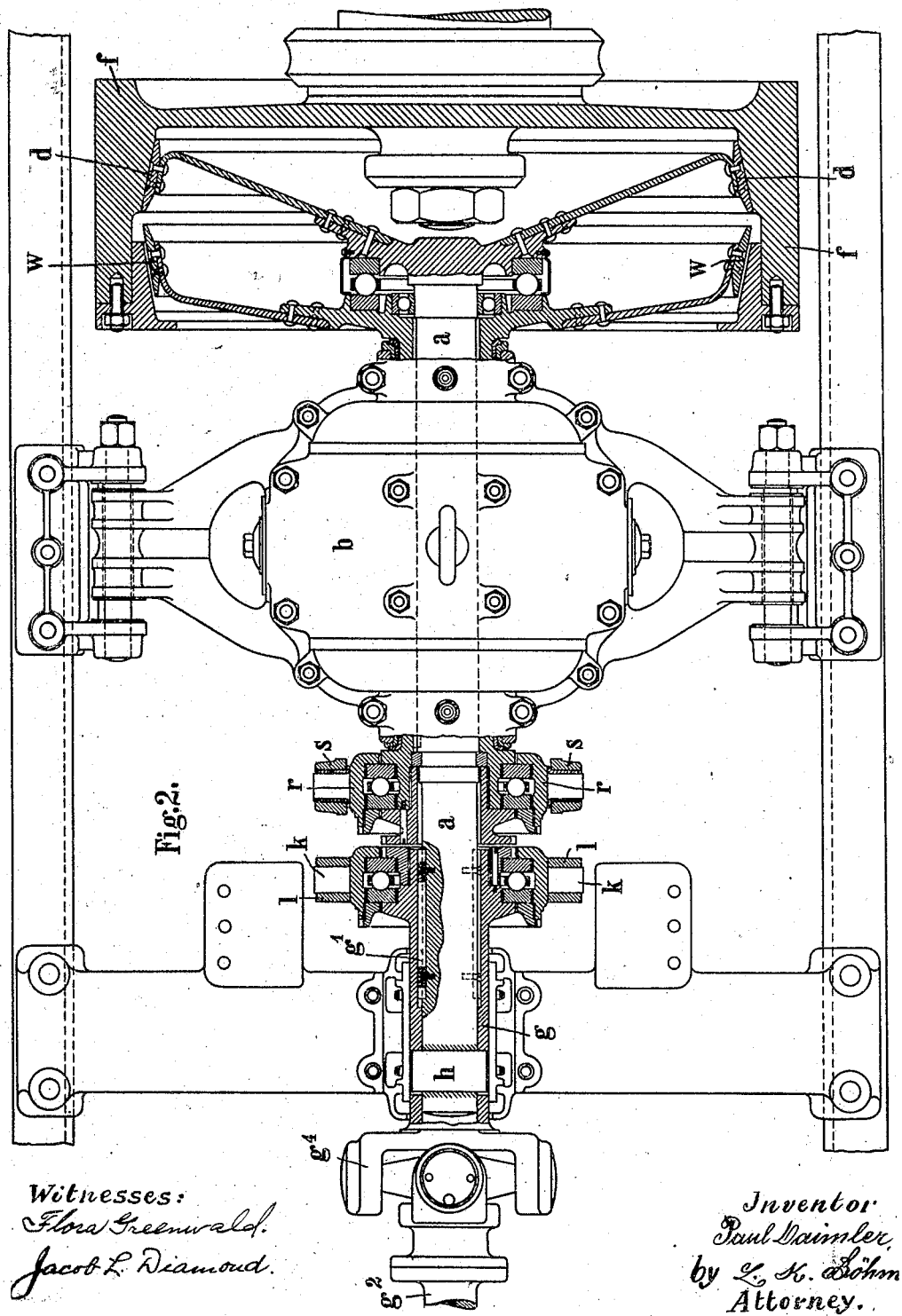

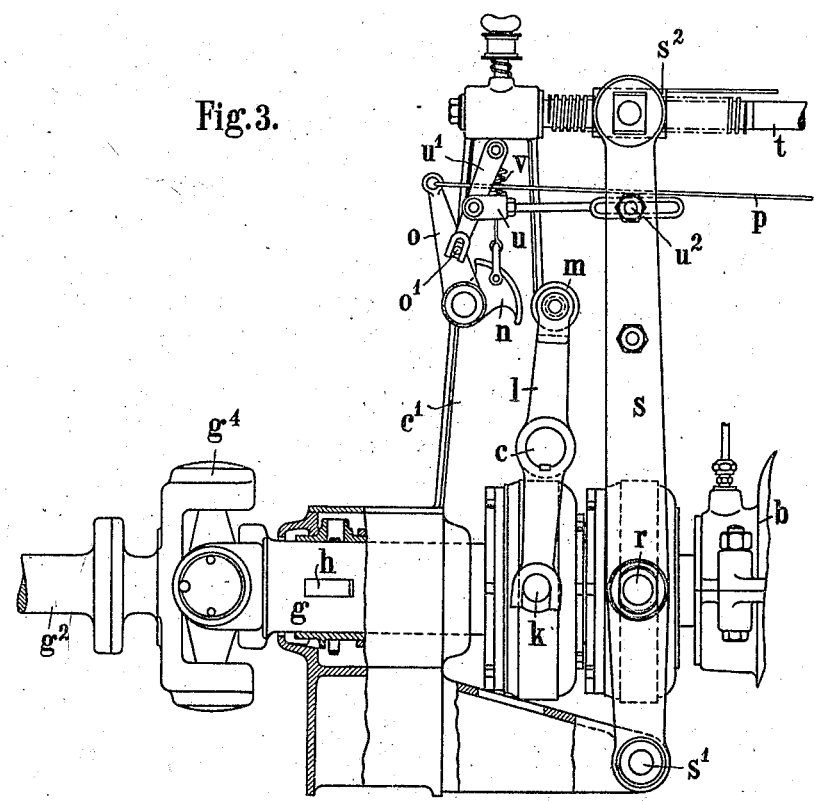

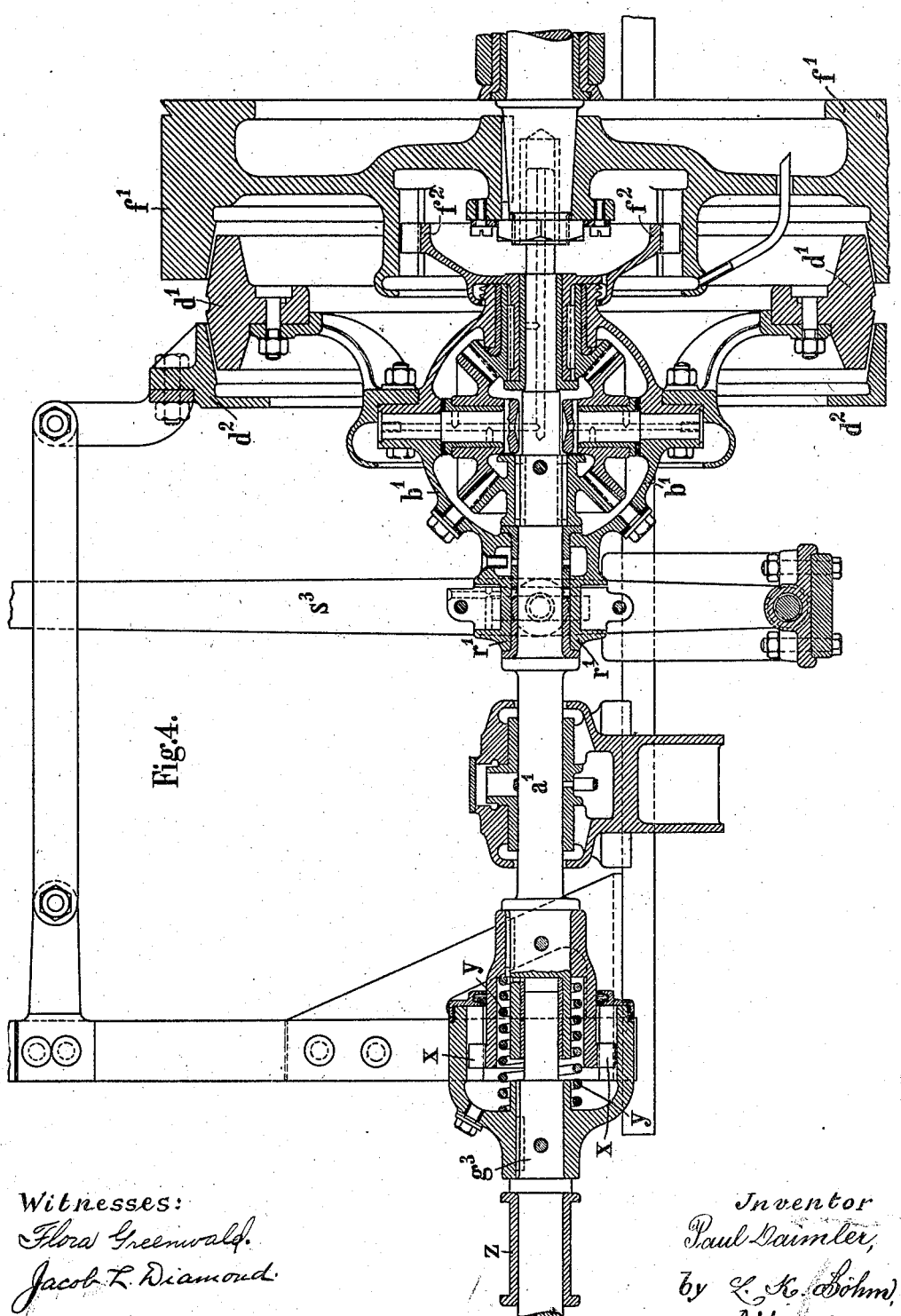

UNITED STATES PATENT OFFICE.

PAUL DAIMLER, OF UNTERTÜRKHEIM, NEAR STUTTGART, GERMANY, ASSIGNOR TO DAIMLER-MOTOREN-GESELLSCHAFT, OF STUTTGART, GERMANY.

TRANSMISSION-GEAR FOR PROPELLER-SHAFTS AND THE LIKE.

No. 924,323.  Specification of Letters Patent.  Patented June 8, 1909.

Application filed November 12, 1908. Serial No. 462,262.

*To all whom it may concern:*

Be it known that I, PAUL DAIMLER, a subject of the King of Würtemberg, and resident of Untertürkheim, near Stuttgart, in the Kingdom of Würtemberg, German Empire, have invented certain new and useful Improvements in Transmission-Gear for Propeller-Shafts and the Like, of which the following is a specification.

This invention relates to the transmission gear employed in transmitting power from a motor to a shaft subjected to an end pressure for instance a propeller shaft. The power is transmitted through a friction clutch which is held in engagement during ordinary running by the end pressure on the propeller or like shaft. Such forms of transmission gear are known in motor boats but they have the disadvantage that when the engine is started the sudden end thrust on the propeller shaft caused by starting the shaft at approximately full speed is liable to give rise to shocks which may cause damage to the boat and unpleasant vibration.

The object of the present invention is to provide a form of transmission gear for use in such propeller shafts and the like and which shall enable a gradual increase of the speed of the propeller shaft and the end thrust of the propeller or the like is only used for holding the friction clutch in engagement after the speed of the propeller shaft has been gradually increased to the maximum.

The present construction includes the following elements: A friction clutch held in engagement by axial pressure, a shaft driven through said clutch and subjected to an axial pressure, means for taking up said axial pressure on the driven shaft independently of the friction clutch and means for rendering said axial pressure resisting means inoperative whereupon the axial pressure on the shaft acts to hold the friction surfaces in engagement.

The improved transmission gear is illustrated in two modifications in the accompanying drawings.

In these drawings Figure 1 is a side elevation of the transmission gear, Fig. 2 is a plan partly in section of the transmission gear shown in Fig. 1, Fig. 3 is a partial view showing the parts in another position to that which is illustrated in Fig. 1 and Fig. 4 is a sectional elevation of a modified form of transmission gear suitable for small motor boats.

In carrying the invention into effect according to the form shown the engine fly wheel $f$ is provided with internal conical surfaces with which conical friction clutch members $d$ and $w$ engage. The friction clutch member $d$ is fixed to a shaft $a$ while the friction clutch member $w$ is fixed to one of the wheels of a beveled wheel reversing gear contained in the casing $b$. The beveled wheel reversing gear is of the well known type for instance that illustrated in section in Fig. 4 and needs no further description. The beveled wheel to which the friction member $w$ is fixed is of course capable of rotating freely on the shaft $a$. The shaft $a$ is continued through the casing $b$ of the reversing gear and is adapted to be moved axially by means of a collar $r$ engaging a forked lever $s$. The forked lever $s$ is pivoted at $s'$ and is adapted to be moved by means of a nut $s^2$ which engages with a screwed spindle $t$. The screwed spindle $t$ is adapted to be rotated by any suitable gear.

Over the left hand end of the shaft $a$ there engages a hollow shaft $g$ which is splined to the shaft $a$ by means of a spline $g'$. Thus the shaft $g$ and the shaft $a$ are adapted to move relatively to one another but rotate together. The amount of the relative movement between the shaft $a$ and the shaft $g$ is limited by a wedge or cotter $h$ extending through the shaft $a$ and projecting into grooves formed in the hollow shaft $g$. On the right hand end of the shaft $g$ there is arranged a collar $k$ forming a thrust bearing which is carried by a lever $l$. The lever $l$ is pivoted at $c$ to a fixed bracket $c'$. At the upper end of the lever $l$ there is arranged a roller $m$ adapted to engage a cam $n$ which is also pivoted on the bracket $c'$. The cam $n$ is operated by a lever $o$ in two ways. First of all the cam $n$ may be moved clockwise in Fig. 1 against the action of a spring $v$ by means of a rod $u$ which actuates a lever $u'$ pivoted to the fixed bracket $c'$ and having a forked end which grips on a pin $o'$ on the lever $o$. The rod $u$ is provided with a slotted end which engages a pin $u^2$ on the lever $s$. Again the cam $n$ may be moved through the wire or the like $p$ which is controlled from a lever $q$. The hollow shaft $g$ is connected through a coupling $g^4$ to the propeller shaft $g^2$.

The operation of this device is as follows: When starting the propeller or like shaft the rod $t$ is rotated so as to move the collar $r$ to the right in Fig. 1 and thereby bring the conical friction member $d$ against its coöperating friction surface of the interior of the fly wheel $f$. By this motion the rod $u$ pulls the cam $n$ downward so that said cam acts as a stop for the roller $m$. The thrust block $k$ is then held in such a position that the hollow shaft $g$ is not allowed to bear against the collar $r$ on the shaft $a$ or on the cotter $h$. It will be seen in this way that the end thrust of the propeller or the like is taken up by the thrust block $k$ carried by the lever $l$. The degree of axial pressure applied between the conical friction member $d$ and the fly wheel $f$ may thus be adjusted so as to effect a gradual increasing of the speed of rotation of the shaft $u$ and the propeller shaft $g^2$. When the desired velocity is reached the lever $q$ is raised so that the cam $n$ takes up the dotted position shown in Fig. 1, thereby liberating the roller $m$ on the lever $l$. In this way the end thrust of the propeller is no longer taken up by the thrust block $k$ and the hollow shaft $g$ slides axially until the right hand side of the thrust block $k$ bears against the left hand side of the collar $r$. The end thrust of the propeller is thus transmitted to the shaft $a$ and thereby directly to the friction member $d$.

When reversing, the lever $s$ is moved to the left in Fig. 1 past the position shown in Fig. 3 i. e. past the position of rest, until the conical friction clutch member $w$ is brought into coöperation with its corresponding friction surface. The drive then takes place through the friction clutch member $w$ reversing gear shaft $b$ shaft $a$ to the propeller shaft $g^2$. The end thrust in the propeller when reversing of course acts in the opposite direction i. e. to the left in Fig. 3 and this end thrust is transmitted from the hollow shatf $g$ to the shaft $a$ through the cotter $h$.

With the device described when the friction members $d, f$ wear away so that the collar $s$ has to make a motion to the right in Fig. 2 in excess of that primarily necessary for engaging the frictional surfaces, it is necessary that the restraining means, the collar or thrust block $k$ should also be allowed to move to the right in Fig. 2. The reason of this, it will be seen, is that the cotter $h$ necessarily follows the motion of the shaft $a$ and an excessive motion of the cotter $h$ can only be permitted when the thrust block $k$ moves to the right. In order to allow this motion the lever $s$ which effects the motion of the collar $r$ is articulated to the cam $n$ by means of the rod $u$ and moves this cam downward when a motion in excess of that primarily necessary is required to effect engagement of the friction member $d$ with the fly wheel $f$. The cam $n$ is, as can be seen from the drawing, so shaped that as it moves downward to the position shown in dotted lines in Fig. 1 it gradually frees the roller $m$. By freeing the roller $m$ the lever $l$ may oscillate through a short distance and thereby the collar $k$ is permitted to move to the right and allow the motion of the cotter $h$.

According to the modification shown in Fig. 4 power is transmitted from the fly wheel $f'$ to the propeller shaft through a friction clutch $d'$ which is adapted to engage either with the fly wheel $f'$ or the fixed rim $d^2$. The fly wheel $f'$ is further coupled to the right hand bevel wheel of the reversing gear $b'$ by means of a coupling $f^2$ which permits of axial motion. The double conical friction clutch member $d'$ is fixed to the casing of the reversing gear $b'$. During forward driving the reversing gear casing $b'$ and the double cone $d'$ are moved to the right in Fig. 4 and the whole thereby caused to rotate in one with the fly wheel $f'$. The axial motion of the friction member $d'$ is obtained by means of a lever $s^3$ engaging a collar $r'$ on the shaft $a'$. The shaft $a'$ is coupled to the propeller shaft through a slidable coupling $x$. A spiral spring $y'$ is interposed between the shaft $a'$ and the shaft $g^3$, and a thrust bearing $z$ for the end pressure during reversing is provided.

In this device it will be seen that the friction coupling $d'$ may be brought gradually into engagement with the fly wheel $f'$. During such engagement the transmission shaft is of course moved slightly relatively to the propeller shaft $g^3$ and the initial thrust is taken up by the spiral spring $y$. After a little the coils of the spring $y$ come into contact with one another and thereby the spring $y$ is rendered inoperative for the purpose of taking up the end thrust of the propeller and the end thrust is transmitted directly to the shaft $a'$ and thereby to the friction member $d'$.

It will be seen that in the above constructions an important result is obtained by arranging a transmission shaft such as $a$ or $a'$ between the driving friction member $f$ or $f'$ and the propeller shaft, the transmission shaft being arranged to move axially with the friction member $d'$ but relatively to the propeller or like shaft $g^2$ or $g^3$. Further it will be seen that in Fig. 1 the cam $n$ as it is rotated clockwise permits motion of the roller $m$ to the left. In this way when the coupling is worn so that a further motion of the lever $s$ to the right is required, this further motion is permitted by the fact that the cam $n$ allows the roller $m$ to move to the left in Fig. 1 and thereby the hollow shaft $g$ is permitted to follow the motion of the cotter $h$. Thus no jamming can take place even after the coupling is worn.

I claim:—

1. In combination, a friction clutch adapted to be held in engagement by axial pressure, a shaft driven through said clutch and subjected to an axial pressure, means for taking up said axial pressure on the driven shaft independently of the friction clutch, and means for rendering said axial pressure resisting means inoperative whereupon the axial pressure on the shaft acts to hold the friction clutch in engagement.

2. In combination, a friction clutch adapted to be held in engagement by axial pressure, a shaft subjected to an axial pressure and driven through said friction clutch, a transmission shaft between said clutch and driven shaft, said transmission shaft being axially movable with the friction clutch but relatively movable axially to the driven shaft, and means for taking up the axial thrust on said driven shaft at starting independently of the friction clutch.

3. In combination, a friction clutch held in engagement by axial pressure, a transmission shaft axially movable with said friction clutch, a driven shaft axially movable relatively to said transmission shaft and geared to rotate therewith, a movable thrust block adapted to take up end pressure of said driven shaft, and means for rendering said thrust block inoperative, substantially as described.

4. In combination, a driven friction clutch member, a transmission shaft axially movable, a friction clutch member fixed on said driven shaft and adapted to engage with said driven friction clutch member, a starting lever articulated to said transmission shaft and adapted to move said shaft axially, a hollow driven shaft splined to said transmission shaft and axially movable relatively thereto, a thrust block for said hollow shaft, a lever carrying said thrust block, a cam controlling said lever, and means for placing said cam out of coöperation with said lever.

5. In combination, a driven friction clutch member, a transmission shaft axially movable, a friction clutch member fixed on said driven shaft and adapted to engage with said driven friction clutch member, a starting lever articulated to said transmission shaft and adapted to move said shaft axially, a hollow driven shaft splined to said transmission shaft and axially movable relatively thereto, a thrust block for said hollow shaft, a lever carrying said thrust block, a cotter carried by said transmission shaft and engaging in a groove in said hollow shaft so as to permit a desired amount of relative axial motion between said shafts, a cam controlling the lever carrying said thrust block, means for operating said cam from the starting lever, and means for rendering said cam inoperative.

6. In combination, a friction clutch, an axially movable transmission shaft, a driven shaft axially movable relatively to said transmission shaft but rotating therewith, means on said transmission shaft and engaging said relatively movable driven shaft for limiting the relative axial motion between said shafts, means for axially moving said transmission shaft for starting purposes, means for restraining the axial motion of said driven shaft, a member controlling said restraining means, said member being articulated to the starting means so that said member shall allow the restraining means to follow the motion of the starting means for the purpose set forth.

In witness whereof I have hereunto set my hand in the presence of two witnesses.

PAUL DAIMLER.

Witnesses:
 ALFRED VISETSER,
 ROBERT UPLAND.